United States Patent

Yamanaka et al.

[11] Patent Number: 5,929,900
[45] Date of Patent: Jul. 27, 1999

[54] SIGNAL PROCESSOR CIRCUIT FOR ENDOSCOPE SYSTEMS OF ALL-PIXELS READOUT TYPE

[75] Inventors: Kazuhiro Yamanaka; Mitsuru Higuchi, both of Omiya, Japan

[73] Assignee: Fuji Photo Optical Co., Ltd., Saitama, Japan

[21] Appl. No.: 08/950,979

[22] Filed: Oct. 15, 1997

[30] Foreign Application Priority Data

Nov. 14, 1996 [JP] Japan .................................. 8-320908

[51] Int. Cl.⁶ .............................. H04N 5/18; H04N 5/225
[52] U.S. Cl. .............................. 348/65; 348/69; 348/220; 348/257; 348/689
[58] Field of Search .................................. 348/65, 69, 70, 348/231, 202, 221, 220, 241, 257, 243, 251, 615, 689, 362; 600/101; 606/45

[56] References Cited

U.S. PATENT DOCUMENTS 4,701,785 10/1987 Willis ........................................... 358/31
5,436,656 7/1995 Soga et al. .............................. 348/220
5,734,424 3/1998 Sasaki ..................................... 348/222

*Primary Examiner*—Andrew I. Faile
*Assistant Examiner*—La Veria Baker
*Attorney, Agent, or Firm*—Snider & Chao; Ronald R. Snider

[57] ABSTRACT

A signal processor circuit which stabilizes a clamp processing of black levels even in an endoscope system of an all-pixels readout type and prevents image qualities from being degraded at a stage to shift from a still image to a moving image in particular. In this signal processor circuit, video signals of all picture elements obtained with a single exposure are read out of a CCD, odd line data is stored into a first memory, even line data is stored into a second memory, and mixed picture element signals are generated by a mixer circuit, whereafter a predetermined image processing is performed by a first DVP. A clamp circuit and an A/D converter are disposed at stages preceding the first and second memories, a through video signal output from the A/D converter is input into the first DVP by way of a selector circuit on the basis of an optical black pulse and a black level clamp signal generated on the basis of the through video signal is fed back to the clamp circuit. Accordingly, the signal processor circuit can perform a favorable clamp processing without using past data stored in the memories.

4 Claims, 8 Drawing Sheets

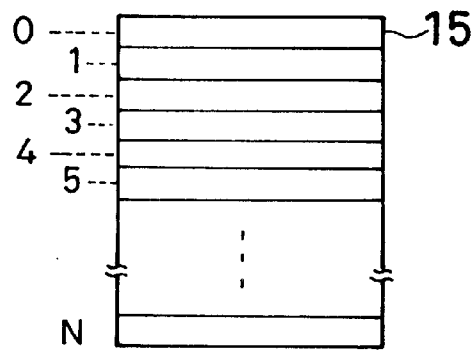
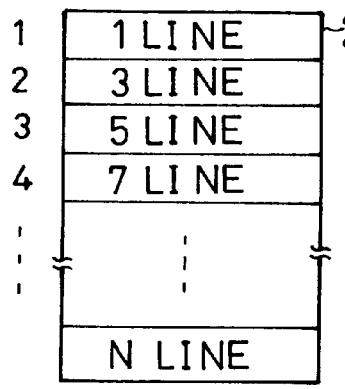
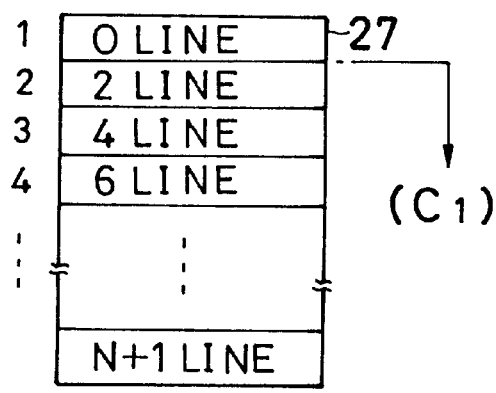
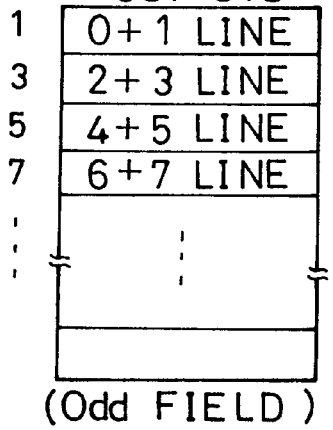
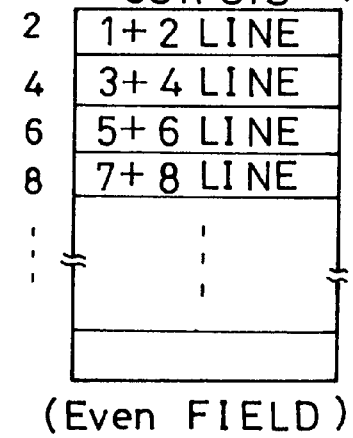

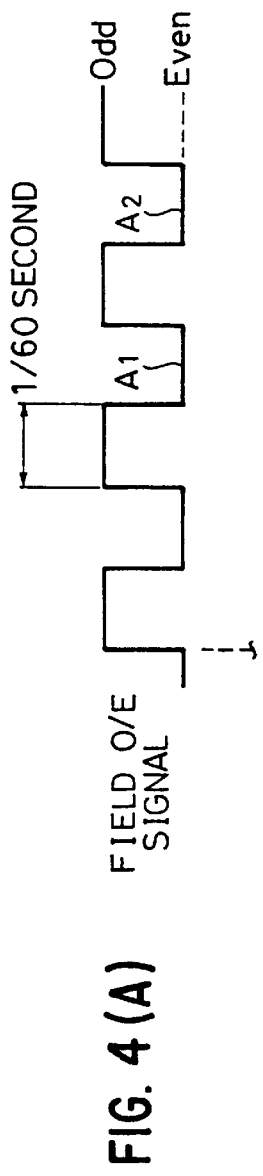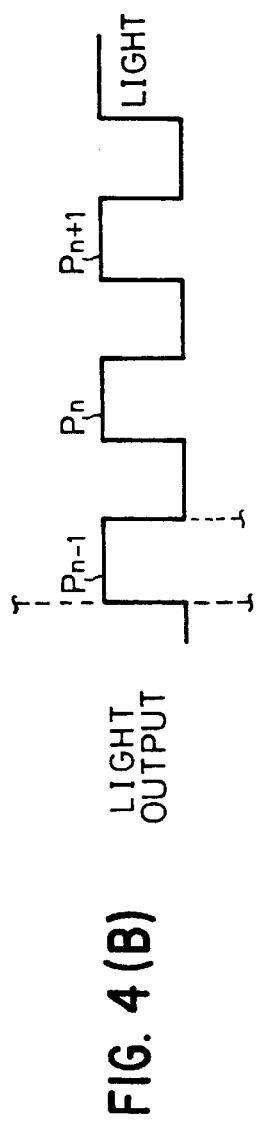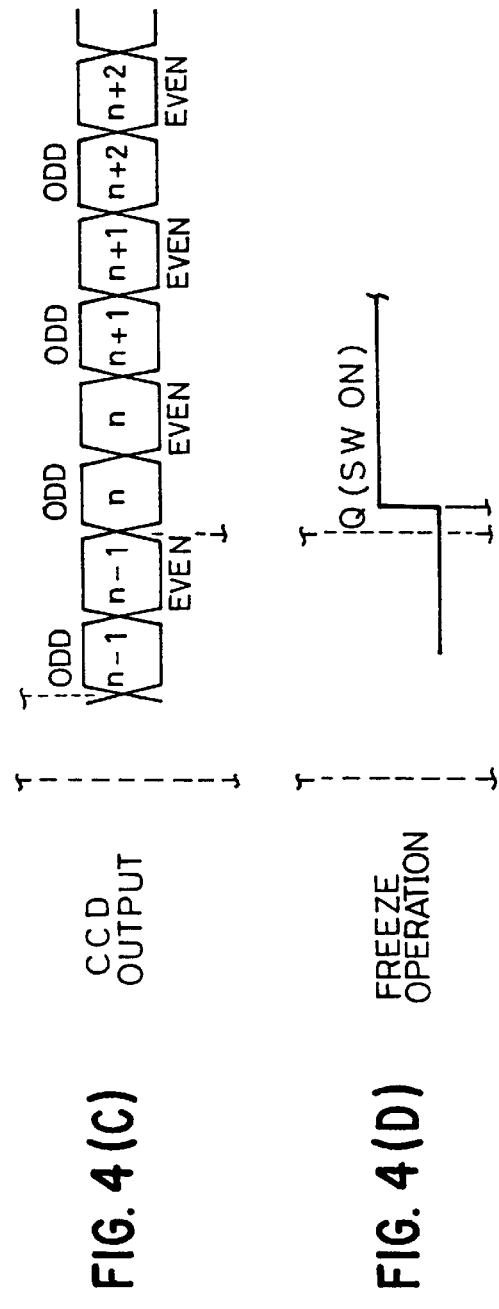
FIG. 4(A) FIG. 4(B) FIG. 4(C) FIG. 4(D)

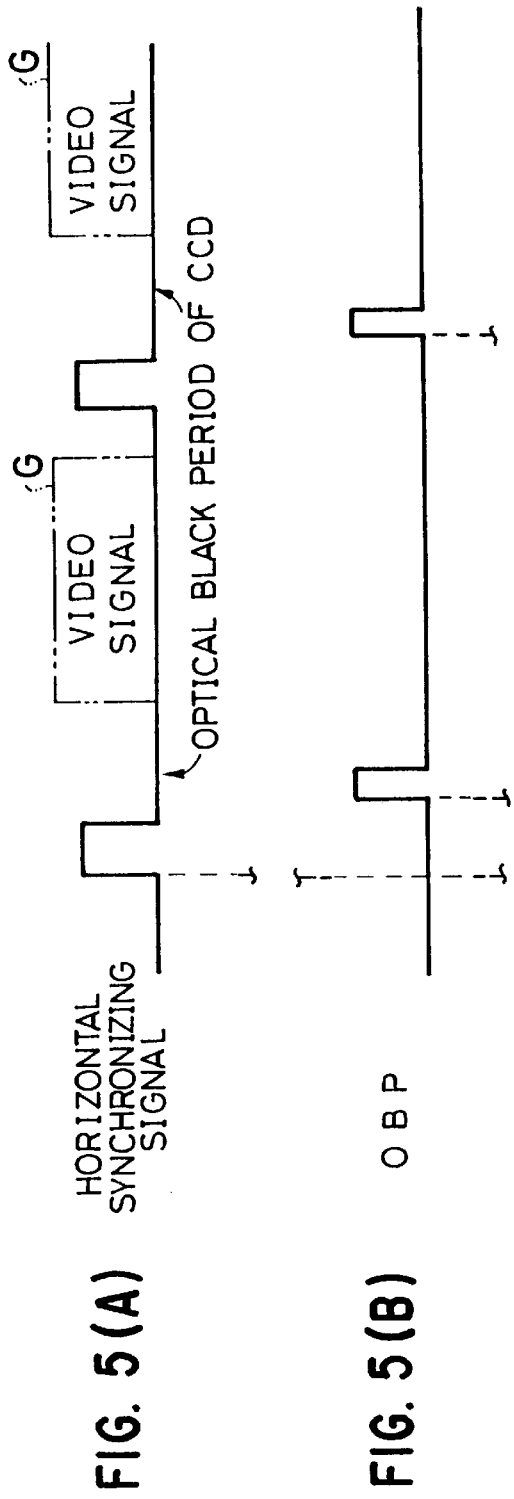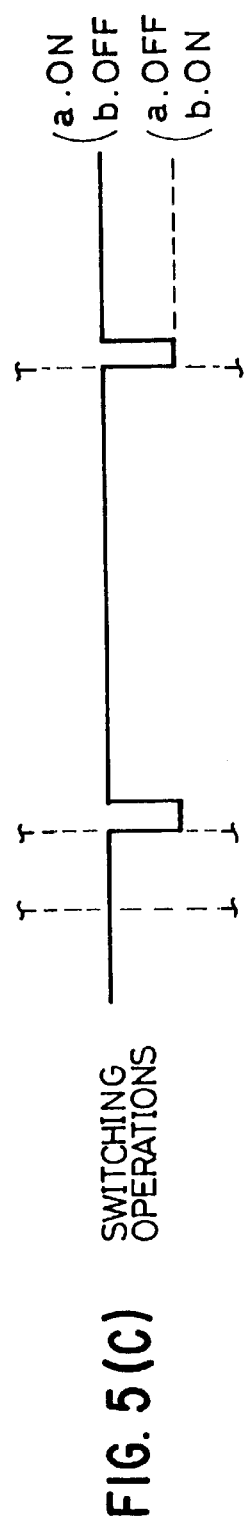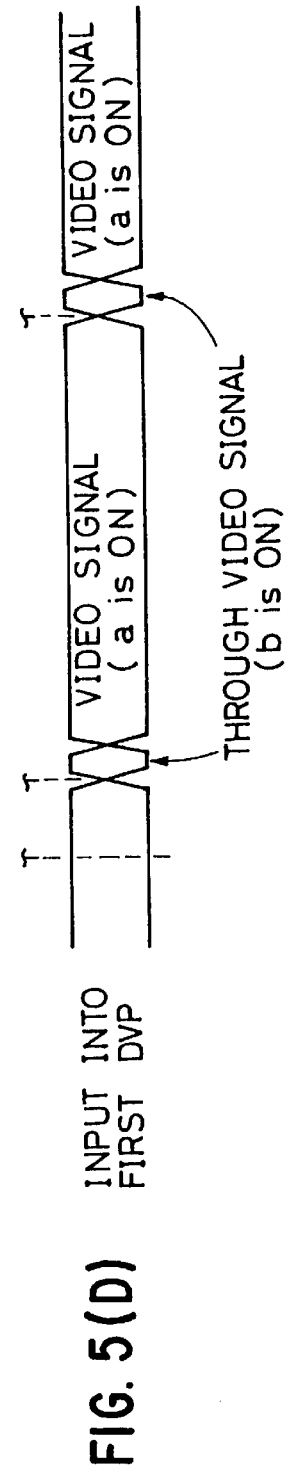
FIG. 5(A) HORIZONTAL SYNCHRONIZING SIGNAL
FIG. 5(B) OBP
FIG. 5(C) SWITCHING OPERATIONS
FIG. 5(D) INPUT INTO FIRST DVP

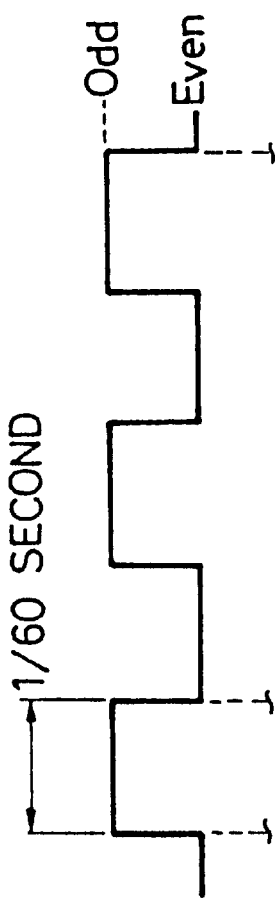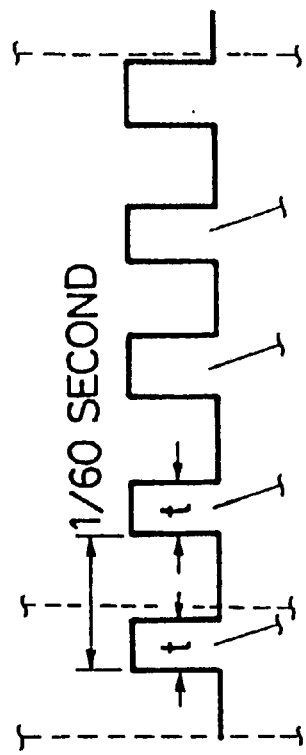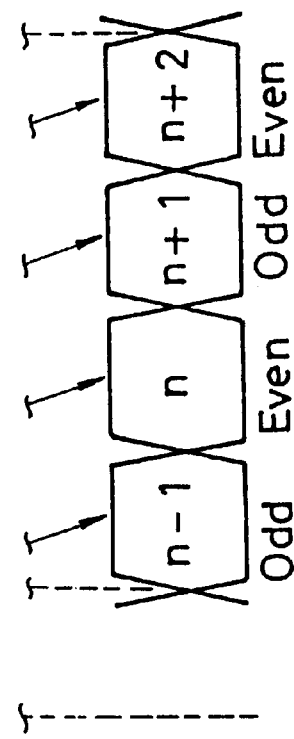
FIG. 7(A) PRIOR ART
FIG. 7(B) PRIOR ART
FIG. 7(C) PRIOR ART

SIGNAL PROCESSOR CIRCUIT FOR ENDOSCOPE SYSTEMS OF ALL-PIXELS READOUT TYPE

BACKGROUND OF THE INVENTION

This application claims the priority of Japanese Patent Application No. 8-320908 filed on Nov. 14, 1996, which is incorporated herein by reference.

1. Field of the Invention

The present invention relates to a signal processor circuit for electronic endoscope systems which read out all picture elements of images accumulated by image pickup devices and form still images of high qualities.

2. Prior Art

An electronic endoscope system uses a CCD (charge coupled device), for example, as an image pickup device which obtains video signals by reading out electric charges accumulated per pixel with photoelectric converter elements. In a simultaneous type electronic endoscope system, color filters are arranged per pixel on a top surface of the CCD for obtaining a colored image.

An arrangement condition of the color filters is illustrated in FIG. 6(A), wherein Mg (magenta), G (green), Cy (cyanic) and Ye (yellow), for example, are arranged per pixel on an top surface of a CCD 1. Accordingly, electric charges are accumulated in the CCD 1 from rays which have transmitted through these color filters.

FIG. 6(B) shows a readout condition in the conventional 2-line mixed reading method, in which stored electric charges of pixels in an upper line and a lower line are read out in a mixed condition.

For example, video signals in Odd fields such as a mixture signal of lines Nos. 0 and 1, a mixture signal of lines Nos. 2 and 3, . . . are read out at a first exposure time, whereas video signals in Even fields such as a mixture signal from lines Nos. 1 and 2, a mixture signal from lines Nos. 3 and 4, . . . are read out at a second exposure time. Accordingly, the mixture signal from the two lines on a CCD 1 is used as a signal from a single line on a field image.

FIG. 7 shows signal readout operations in the CCD 1, in which Odd fields and Even fields are obtained at intervals of ⅟₆₀ second (a vertical synchronizing period) as indicated by a field O/E signal in (A) of FIG. 7.

Accordingly, signals are accumulated for an accumulating (exposure) time t of an electronic shutter within the period of ⅟₆₀ second described above, for example, as shown in (B) of FIG. 7 and the accumulated mixture signals are read out during the next period of ⅟₆₀ second. As a result, an Odd field signal (No.) n-1 and an Even field signal n are obtained as shown in (C) of FIG. 7, whereby the Odd field signal n-1 is composed of mixture signals from lines Nos. (0+1), (2+3), (4+5), . . . which are shown on the left side in (B) of FIG. 6, whereas the Even field signal n is composed of mixture signals from lines Nos. (1+2), (3+4), . . . which are shown on the right side in (B) of FIG. 6.

The Odd field signal and the Even field signals are subjected to an interlace scanning and formed into an image within a single frame, which is displayed on a monitor.

However, the simultaneous type electronic endoscope system allows a time deviation of ⅟₆₀ second to be produced between an Odd field image and an Even field image which are to be used for forming an image within a single frame as shown in (C) of FIG. 7, thereby posing a problem that an image quality is lowered when the endoscope itself vibrates or an object to be observed moves during this time deviation.

Endoscopes in particular are equipped with freeze switches and display still images through manipulation of these switches for permitting detailed observation of specific locations. Since a frame of such a still image is displayed on the basis of the Odd and Even field signals described above, a degradation of image quality (including discoloration) is caused when a deviation (vibration or movement) is caused between the Odd and Even field images.

In processing of the video signals obtained from an image pickup device, a clamp which matches black levels is performed as known well for cancelling a difference between amplification degrees of the signals, etc. and the clamp processing has an important role for maintaining a favorable image quality.

SUMMARY OF THE INVENTION

The present invention has been accomplished in view of the problems described above and has a primary object to provide an electronic endoscope system of an all-pixels (picture elements) readout type which improves image qualities by adopting a signal processor circuit of an all-pixels read out type performs a stable clamp processing of blak levels regardless of the all-pixels readout type and can prevent the image qualities from being degraded in particular at a stage to return from a still image to a moving image.

To aid understanding of the present invention, description will be made first of a fact which has been adopted as a premise. As a version of the all-picture readout type described above, the applicant proposes a system which reads out all pixels obtained with an image pickup device with a single exposure, stores all picture element signals once into memories and improves image qualities by processing video signals stored in these memories. Also in the processing of the video signals in this case, a clamp processing which matches black levels is carried out as known well for cancelling a difference between amplification degrees of signals and so on.

By the clamp processing in this system of the all-pixels readout type which generates a feedback clamp signal on the basis of the video signals once stored in the memories, however, the feedback clamp signal may be generated from old video signals in particular at a stage to form a still image, thereby remarkably varying black levels of signals at a stage to shift from a still image to a moving image. Accordingly, this system produces an inconvenience that it degrades color reproducibility in such a case.

Therefore, the electronic endoscope of the all-pixels readout type according to the present invention is characterized in that it comprises an image pickup device on which a plurality of color filters are arranged per pixel, an image pickup device driving circuit which controls so as to read out video signals of allpixels stored by the image pickup device per pixel with a single exposure, a clamp circuit which clamps video signals read out of the image pickup device with a feedback clamp signal, memories which store the video signals from the clamp circuit, a selector circuit which is connected at a stage subsequent to the memories, receives a through video signal from a circuit disposed at a stage preceding the memories and selectively outputs the video signals stored in the memories and the through video signal, and a signal processor circuit which is disposed at a stage subsequent to the selector circuit, performs a predetermined processing of the video signals and generates the feedback clamp signal from the through video signal, whereby the feedback clamp signal generated on the basis of the through video signal output from the signal processor circuit is supplied to the clamp circuit.

The selector circuit described above can be switched at a timing of an optical black pulse. Further, a switching operation of the selector circuit can be executed only at a stage to shift to a moving image after a still image formation processing is started.

Another invention is characterized in that the image pickup device driving circuit controls so as to first read out video signals from odd or even lines and then read out video signals from the rest lines out of the video signals stored per pixel by the image pickup device with a single exposure, that the memories store the video signals from the odd lines and the video signals from the even lines which are obtained by the image pickup device, and that the electronic endoscope system comprises light intercepting means which intercepts an illumination light beam so that video signals are not accumulated in the image pickup device for a predetermined time at a stage to read out the video signals with the image pickup device driving circuit and a mixer circuit which generates simultaneous video signals by mixing the video signals from the odd lines with the video signals from the even lines which are read out of the memories, whereby a field image is formed on the basis of picture element mixture signals output from the mixer circuit.

In the configuration described above, electric charges which are accumulated with an exposure (an exposure time optional) within a first period of 1/60 second (a vertical synchronizing period), for example, are read out from the odd lines of the image pickup device (CCD) during a second period of 1/60 second (read out of a transfer line) and read out from the rest even lines during a third period (the next exposure time) of 1/60 second. For reading out the electric charges from the even lines, a light source beam is intercepted by a light chopper or the like during the second period. In other words, the electric charges cannot be read out from the rest even lines when electric charges are stored with the next exposure during the second period during which the stored electric charges from the odd lines are progressively read out as in the conventional mode. Therefore, the electronic endoscope system according to the present invention is configured so as not to provide light output during the second period so that the stored electric charges from the even lines can be read out during the third period, whereby it is capable of reading out signals corresponding to all the picture elements on the image pickup device which are obtained with a single exposure.

Video signals from the odd lines and the even lines which are read out as described above are stored in the memories, read out as picture element mixture signals, for example, by a technique which is the same as that in the color-difference line progressive mixture readout mode and subjected to a predetermined image processing by the signal processor circuit. At this stage, the through image signal which does not pass through the memories is supplied to the signal processor circuit by operations of the selector circuit, and a feedback clamp signal is generated on the basis of the through image signal and supplied to the clamp circuit. Accordingly, the clamp processing is performed on the basis of newest signals which are progressively output from the image pickup device, whereby mismatching of the black levels is not allowed even when a still image is switched to a moving image.

BRIEF DESCRIPTION OF THE DRAWINGS

FIGS. 3(A) through 3(E) are diagrams illustrating image data read out at stages from a CCD to a mixer circuit of the embodiment of the present invention;

FIG. 5 is a diagram descriptive of clamp processing operations in the embodiment of the present invention;

FIG. 7 is a diagram descriptive of the conventional CCD.

DESCRIPTION OF THE EMBODIMENT

Figure 1:
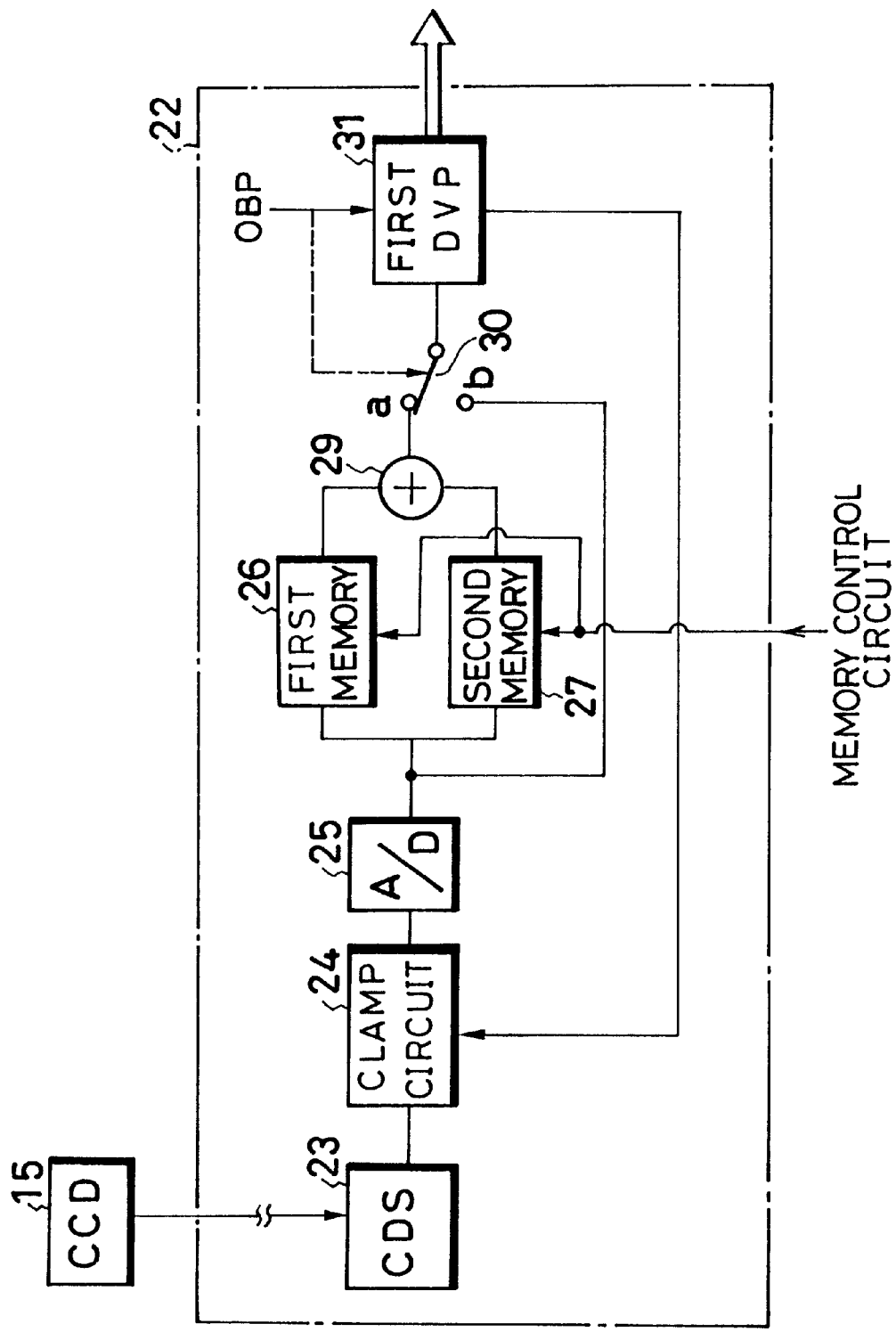
FIG. 1 is a block diagram illustrating a configuration of a readout signal processor circuit of an embodiment of the electronic endoscope system of the all-pixels readout type.
Figure 2:
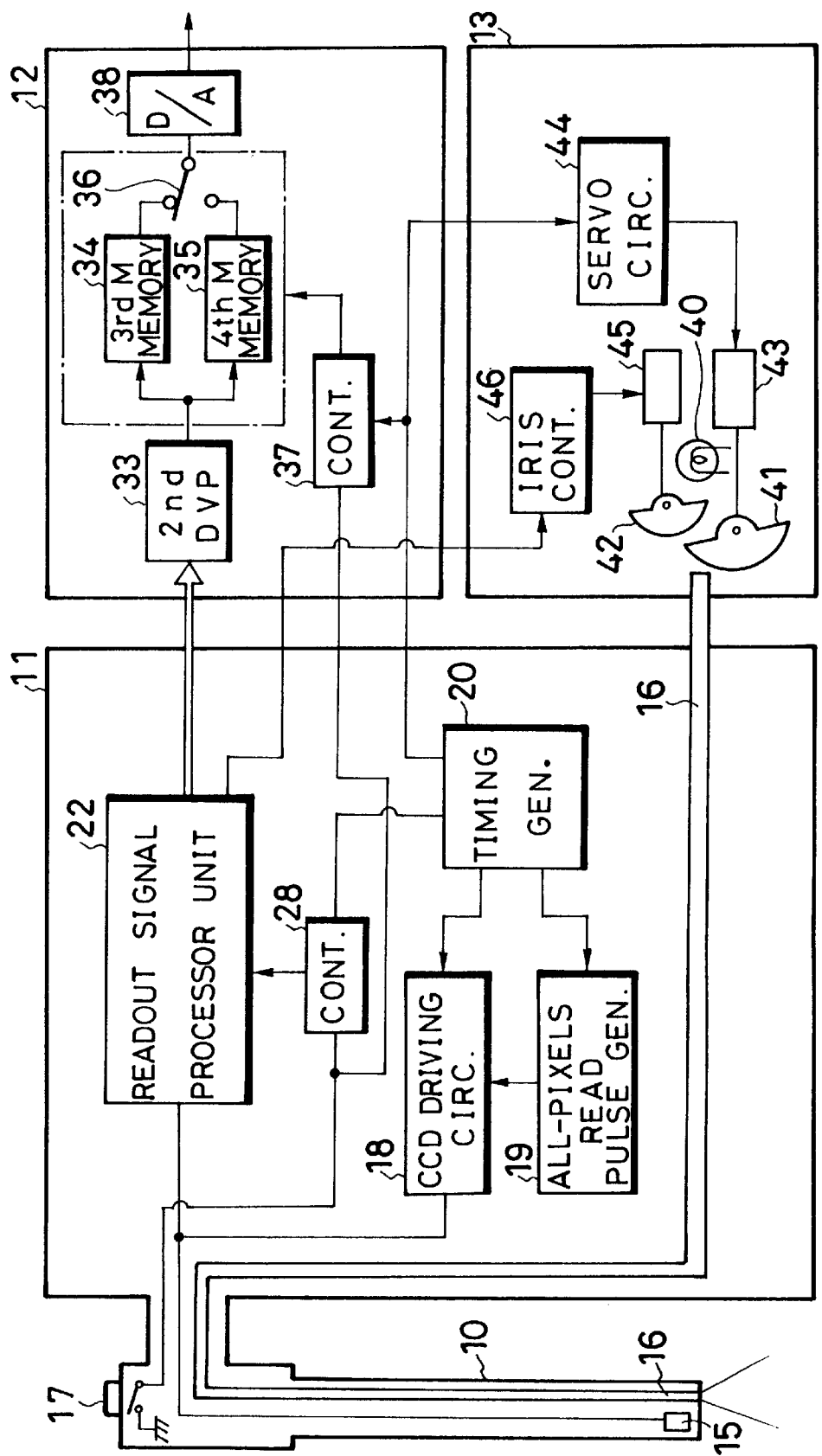
FIG. 2 is a block diagram illustrating an overall circuit configuration of the embodiment of the electronic endoscope system according to the present invention.
Figures 6A, 6B:
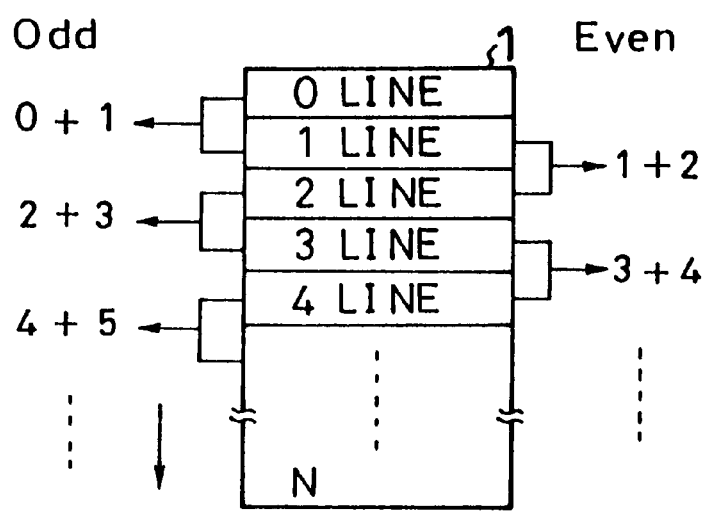
FIG. 6(A) is a diagram illustrating a configuration of color filters on a conventional CCD.
FIG. 6(B) is a diagram descriptive of mixture readout from the conventional CCD.

FIGS. 1 and 2 show a circuit configuration of an embodiment of the electronic endoscope system of the all-pixels readout type according to the present invention: FIG. 1 illustrating a detailed internal configuration of a signal processor shown in FIG. 2. The electronic endoscope system is composed, as shown in FIG. 2, of an electronic endoscope 10 adopted as a scope, a connector circuit 11 for the electronic endoscope 10, a processor unit 12 and a light source unit 13. A CCD 15 equipped at its tip with color filters which are similar to those described with reference to FIG. 6 and a light guide 16 for leading a light beam emitted from the light source unit 13 to the tip are disposed in the electronic endoscope 10. Further, a freeze switch 17 for displaying a still image is disposed on a controller of the electronic endoscope 10.

Disposed in the connector circuit 11 are a CCD driving circuit 18 for driving the CCD 15, all-pixels readout pulse generator circuit 19 and a timing generator 20. The all-pixels readout pulse generator circuit 19 generates, on the basis of signals from the timing generator 20, pulses for reading out data corresponding to all picture elements accumulated in the CCD 15 with a single exposure separately from odd lines and even lines, and supplies the data to the CCD driving circuit 18. On the basis of the readout pulses, the CCD driving circuit 18 performs control for progressively reading out signals of the odd lines and signals of the even lines from the CCD 15. Further, a readout signal processor unit 22 is disposed for receiving output signals from the CCD 15.

As shown in FIG. 1, disposed in the readout signal processor unit 22 are a CDS-correlated double sampling circuit 23, a clamp circuit 24 which matches black levels of video signals with a standard level on the basis of a feedback clamp signal, an A/D converter 25 for converting input analog signals into digital signals, a first memory 26 for storing image data, for example, of the odd lines, and a second memory 27 for storing image data of the even lines. A memory control circuit 28 (FIG. 2) for controlling write/readout is connected to the first memory 26 and the second memory 27, and a mixer circuit 29 is disposed at a stage subsequent to these memories 26 and 27.

Speaking concretely, video signals are output from the CCD 15 not in a condition where the video signals from two lines are mixed with each other as in the conventional electronic endoscope system, but data of all the picture elements is stored once into the respective memories 26 and 27 in a condition where the video signals are separated into the video signals from the odd lines and the video signals from the even lines. Subsequently, the mixer circuit 29 adds and mixes the data of the odd lines to and with the data of the even lines, thereby generating signals which are equivalent to those obtained by the conventional endoscope system of the color-difference line progressive mixture readout type.

FIGS. 3(A) through 3(E) illustrate contents of image data generated by the circuits from the CCD 15 to the mixer circuit 29. The CCD 15 has horizontal lines, i.e., lines Nos. 0 to N which are disposed so as to correspond to scanning lines and is configured to transfer the image data of these horizontal lines to a transfer line for readout. In the CCD 15, data of the odd lines (lines Nos. 1, 3, 5, . . .) is stored into the first memory 26 shown in FIG. 3(B), whereas data of the even lines (lines Nos. 2, 4, 6, . . .) is stored into the second memory 27 shown in FIG. 3(C).

The data stored in these memories 26 and 27 are used by the mixer circuit 29 for mixing picture elements of the lines shown in FIG. 3(B) with those of the lines shown in FIG. 3(C), and addition operation data such as line No. 0+line No. 1, line No. 2+line No. 3, and line No. 4+line No. 5 is output as Odd field data as shown in FIG. 3(D). In a condition where readout lines are shifted downward for a distance of one line (the data is read out of a location indicated by C1), the picture elements of the lines shown in FIG. 3(B) are mixed with those of the lines shown in FIG. 3(C), and addition operation data such as line No. 1+line No. 2, line No. 3+line No. 4, and line No. 5+line No. 6 is output as Even field data as shown in FIG. 3(E). Odd numbers and even numbers of the lines in the CCD 15 will be represented by ODD and EVEN respectively, and odd numbers and even numbers of fields to be subjected to interlace scanning will be designated by Odd and Even respectively for discrimination.

Further, a selector circuit 30 and a first DVP (digital video processor) 31 are disposed at stages subsequent to the mixer circuit 29. The selector circuit 30 performs switching between video signals output from the A/D converter 25 which have not passed through the memories 26 or 27 (terminal b) and the video signals output from the mixer circuit 29 (terminal a). An optical black pulse (OBP) is input into the first VDP 31 described above and a feedback clamp signal is generated by the OBP from an optical black period of the video signals. Further, a color-difference signal and a luminance signal are generated by carrying out a predetermined color image processing.

A second DVP 33 which is connected to the first DVP 31 is disposed in the processor unit 12 as shown in FIG. 2, and control of a location of an image, a magnifying processing and a mirror image processing are performed in the second DVP 33. Disposed at stages subsequent to the second DVP 33 are a third memory 34 for storing Odd field data, a fourth memory 35 for storing Even field data, a selector circuit 36, a memory control circuit 37 and an A/D converter 38. Speaking more concretely, the data shown in FIG. 3(D) which is converted into a color-difference signal and so on is stored as the Odd field data in the third memory 34, whereas the data shown in FIG. 3(E) which is converted into a color-difference signal and so on is stored as the Even field data in the fourth memory 35.

Further, a light source 40 is disposed in the light source unit 13 which is to be connected to the light guide 16 arranged in the electronic endoscope 10, and a light chopper 41 and an iris stop 42 are disposed between the light source 40 and an end of incidence of the light guide 16. The light chopper 41 is configured to rotate a semicircular plate, for example, and a driving circuit 43 and a servo circuit 44 are connected to the light chopper 41 for rotating it at a cycle of 1/30 second. Accordingly, the light chopper 41 is capable of allowing light to be output for 1/60 second and intercepting it for the next 1/60 second with field O/E signals having a cycle of 1/60 second.

On the other hand, the iris stop 42 is connected to a driving circuit 45 and an iris control circuit 46 which are capable of adjusting a light amount output from the light source 40 by driving the iris stop 42 on the basis of the luminance signal obtained with the first DVP 31.

Figure 4E:
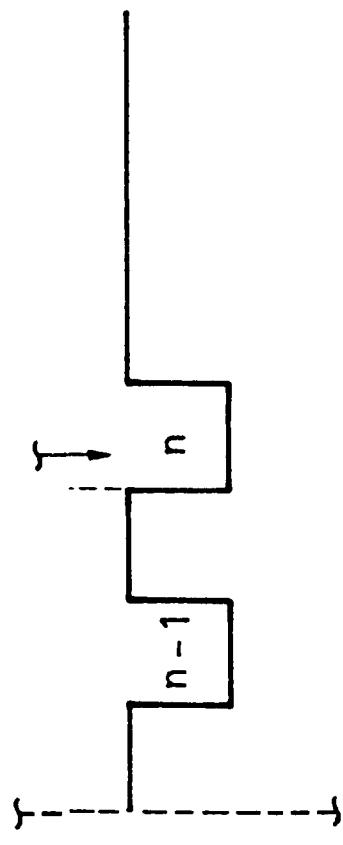
FIG. 4 is a diagram descriptive of operations at stages until mixed pixel signals are obtained in the embodiment of the present invention.
Figure 4F:
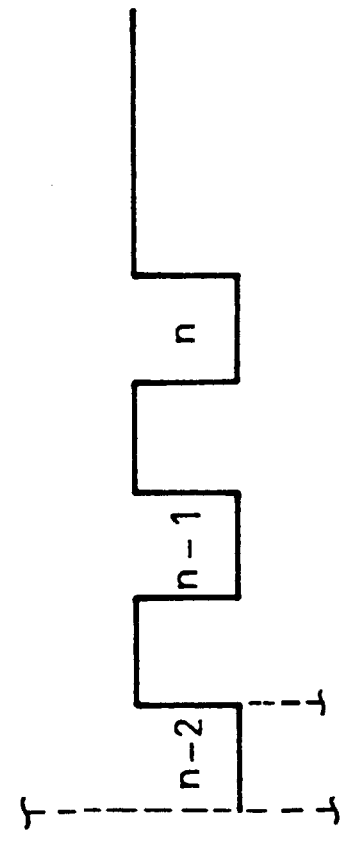
Figure 4G:
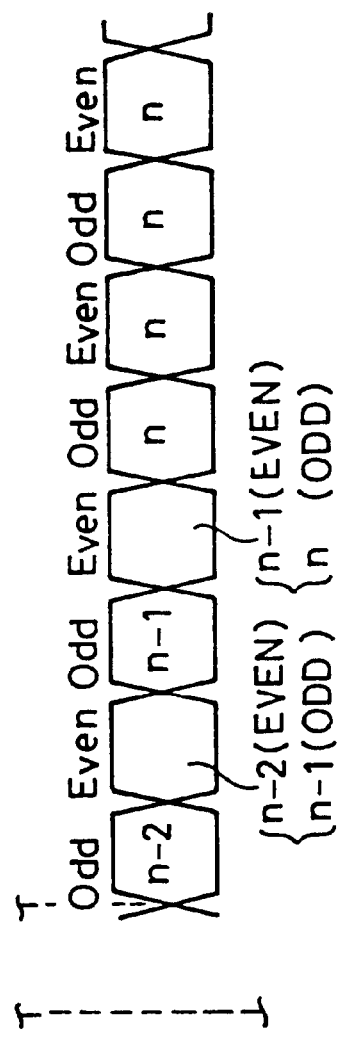

The embodiment has the configuration described above and explanation will be made first of its operations for reading out all the picture elements. FIG. 4 illustrates processings performed at the stages from the CCD 15 to the mixer circuit 29. Like the conventional system, the embodiment uses a timing signal which forms a field at a cycle of 1/60 second as a field O (Odd)/E (Even) signal as shown in (A) of FIG. 4. By rotating the light chopper 41 at a cycle of 1/30 second so as to correspond to this signal, a light beam is output repeatedly for a period of 1/60 second as represented by $P_{n-1}$, $P_n$ and $P_{n+1}$ in (B) of FIG. 4 while intermittently reserving a condition where the light beam is intercepted. This light beam is led through the light guide 16 and emitted from the tip for irradiating an interior of a body to be observed.

When the interior of the body is irradiated with the light beam, its image is captured by the CCD 15 disposed in the tip and electric charges corresponding to the image are accumulated in the CCD 15. Under the control by the all-pixels readout pulse generator circuit 19 and the CCD driving circuit 18, data of all the pexels on the CCD 15 which is stored and obtained with a single exposure is read out in a condition where divided into ODD line data and EVEN line data. Speaking more concretely, data of ODD line n-1 and data of EVEN lines are sequentially read out of the CCD 15 as shown in (C) of FIG. 4 on the basis of the exposure to a light output $P_{n-1}$ shown in (B) of FIG. 4, and the ODD line data is stored into the first memory 26 with a write enable signal shown in (E) of FIG. 4, whereas the EVEN line data is stored into the second memory 27 with a write enable signal shown in (F) of FIG. 4. Further, data of ODD and EVEN lines is read out in a sequence of $P_n$, $P_{n+1}$, . . . , and stored into the memories 26 and 27.

Then, picture elements of the data stored in the memories 26 and 27 are mixed by the mixer 29, whereby an Odd field signal obtained by mixing data of an ODD line (No.) n-2 with that of EVEN lines, an Even field signal obtained by mixing data of an EVEN line No. n-2 with that of ODD line No. n-1, an Odd field signal obtained by mixing data of an ODD line (No.) n-1 with that of the EVEN lines, . . . are sequentially generated. These field signals are subjected to color image processing and stored once into the third memory 34 and the fourth memory 35. Outputs from these memories 34 and 35 are provided alternately by the selector circuit 36 to a monitor and displayed as images by the interlace scanning.

Accordingly, the embodiment allows a moving image to be displayed in a condition where it is mixed with a portion of image data obtained with the next exposure, but reduces influences due to vibrations and movements which could be caused for the 1/60 second since the image data has an amount of 1/2 of the whole amount.

When the freeze switch 17 is depressed for forming a still image, on the other hand, the write enable into the first memory 26 and the second memory 27 are inhibited. When the freeze switch 17 is turned on at a time of Q shown in (D)

of FIG. 4 at which the field O/E signal is falling (A1), for example, the write enable into the memories 26 and 27 is inhibited at the next falling time (A2). [(E) and (F) of FIG. 4]. Accordingly, next data is not written in a condition where data of an ODD line No. n obtained with the light output $P_n$ is written in the first memory 26 and data of an EVEN line No. n is written in the second memory 27.

As a result, Odd field signals and Even field signals which are composed of the ODD and EVEN lines No. n are sequentially read out as shown in (G) of FIG. 4 and displayed as a still images by the interlace scanning. A combination of field images at different times is inhibited and a still image is displayed on the basis of data of all the picture elements in a single exposure, thereby making it possible to observe images of interiors of bodies to be observed which have high image qualities.

Now, description will be made of a clamp processing of a black level with reference to FIG. 5. In the electronic endoscope system preferred as the embodiment which uses a horizontal synchronizing signal shown in (A) of FIG. 5, an optical black period is set just before a substantial image signal G is obtained, for example, as shown in the drawing. This period is formed by reserving a section in which a incident light beam is intercepted. An OBP (optical black pulse) shown in (B) of FIG. 5 is supplied to the first DVP 31 shown in FIG. 1 for extracting a signal (voltage) during the optical black period and the selector circuit 30 is switched with a switch turn-over signal shown in (C) of FIG. 5 on the basis of the OBP.

As a result, the selector circuit 30 is switched to the terminal b during a period wherein the OBP is being input and a through image signal, i.e., an output from the A/D converter 25 is input into the first DVP 31 as shown in (D) of FIG. 5. During another period wherein the OBP is not being input, on the other hand, the selector circuit 30 is turned over to the terminal a, and a mixed pixel element signal which is formed by the mixer circuit 29 with the output signals from the memories 26 and 27 is input into the first DVP 31.

Subsequently, a voltage during the optical black period of the through image signal is sampled by the OBP in the first DVP 31 and the voltage signal is supplied as a feedback clamp signal to the clamp circuit 24. In the clamp circuit 24, a black level signal of the video signal is reproduced using the clamp signal as an input, whereby a black level of the video signal is controlled so as to be constant.

The clamp processing described above which uses the through image signal can prevent the black level from being mismatched when returning from a still image to a moving image. Speaking more concretely, the mixed pixel signal is lagged from the through image signal for a time corresponding to that required for forming two fields since the mixed pixel element signal is stored in the memories 26 and 27. Strictly speaking, the time lag makes it impossible to carry out an accurate clamp processing when the clamp processing is carried out on the basis of the signal output from the mixer circuit 29, but the time lag is small enough to suppress substantial influences on images at extremely low levels.

When a still image is to be displayed, however, an accurate clamp processing cannot be carried out since the write enable into the memories 26 and 27 is inhibited and new image data is not input into the first DVP 31 while the still image is being formed, whereby the feedback clamp control is performed using past data having a large time lag in a condition where the freeze operation is released. Accordingly, the present invention is effective for a clamp processing at a stage to shift from a still image to a moving image in particular, and makes it possible to carry out an accurate clamp processing and stabilize black levels of video signals by generating feedback clamp signals on the basis not of still image signals but of the output signals from the CCD 15 before they are stored into the memories 26 and 27.

Though the embodiment is configured to operate the selector circuit 30 so as to input the through image signal into the first DVP 31 always at a timing of the OBP, it is possible to operate the selector circuit 30 within a limited period after formation of a still image is started till (after) a still image is shifted to a moving image.

As understood from the foregoing description, the present invention makes it possible to stabilize a clamp processing of black levels even in signal processings of the all-pixels read out type and provides a merit to permit preventing image qualities from being degraded at a stage to shift from a still image to a moving image.

What is claimed is:

1. A signal processor circuit for endoscope systems of an all-pixels readout type comprising:

an image pickup device having a plurality of color filters arranged per pixel;

an image pickup device driving circuit which controls so as to read out video signals of all the pixels stored for each pixel by the image pickup device with a single exposure;

a clamp circuit which clamps the video signals read out of said image pickup device with a feedback clamp signal;

memories for storing the video signals from said clamp circuit;

a selector circuit which is connected at a stage after said memories, receives a through video signal from a circuit disposed at a stage preceding said memories, and selectively outputs the video signals in said memories and said through video signal; and a signal processor circuit which is disposed at a stage subsequent to said selector circuit, performs a predetermined processing of the video signals and generates a feedback clamp signal from said through video signal, wherein a feedback clamp signal which is output from said signal processor circuit on the basis of the through video signal is supplied to said clamp circuit.

2. A signal processor circuit for endoscope systems of an all-pixels readout type according to claim 1, wherein said selector circuit is configured to switch the signals at a timing of an optical black pulse.

3. A signal processor circuit for endoscope systems of an all-pixels readout type according to claim 1, wherein operation of said selector circuit is executed only at a stage to shift to a moving image after a still image formation processing is started.

4. A signal processor circuit for endoscope systems of an all-pixels readout type according to claim 1, wherein said image pickup device controls so as to first read out video signals from lines having odd or even numbers and then read out video signals from remaining lines stored by said image pickup device per pixel with a single exposure, wherein said memories store the video signals from said lines having the odd numbers and video signals from said lines having the even numbers which are obtained from said image pickup device, wherein said signal processor circuit comprises light beam intercepting means which intercepts an illumination light beam so that picture element signals are not stored in said image pickup device for a predetermined time for which video signals are read out by said image pickup device driving circuit, wherein said signal processor circuit comprises a mixer circuit which generates simultaneous type video signals by mixing the video signals from said lines having the odd numbers and said lines having the even numbers which are read out of said memories, and wherein said signal processor circuit is configured so as to form field images on the basis of mixed pixel signals output from said mixer circuit.

* * * * *